Patented Feb. 27, 1934

1,948,903

UNITED STATES PATENT OFFICE 1,948,903

PROCESS FOR IMPROVING ACYL CELLULOSE

Erich Correns and Albert Möhring, Elberfeld, Germany, assignors to I. G. Farbenindustrie Aktiengesellschaft, Frankfort - on - the - Main, Germany, a corporation of Germany No Drawing. Application October 13, 1928, Serial No. 312,394. In Germany October 22, 1927

5 Claims. (Cl. 260—102)

The present invention relates to a process for the improvement of acyl celluloses by a treatment with hydrolytically acting agents at atmospheric pressure and at temperatures up to 100° C. in order to remove to a far reaching extent the harmful remaining amounts of the condensing agents used in the acylation of the celluloses.

It is known that even after most thoroughly rinsing acyl cellulose manufactured in accordance with any of the customary processes, it still contains in a combined or adsorbed form a small amount of the condensing agent used for the acylation. This content of condensing agent suffices generally to produce a slow decomposition of the acyl cellulose and therewith a deterioration in respect of solubility and strength.

It is also known that these residues of the condensing agent can be removed from the acyl cellulose to a far reaching extent by subjecting the latter to a treatment with very dilute acid at temperatures above 100° C., that is to say, under superatmospheric pressure. This after treat-treatment is usually called "stabilization."

In accordance with the present invention the after treatment of acyl cellulose, especially acetyl cellulose, is carried out in a simpler and more cautious manner and with the attainment of equally good stability at lower temperatures and without the use of superatmospheric pressure by the use of a hydrolytically acting agent of the group comprising suitable diluted organic and inorganic acids and substances displaying acid character in contact with water, such as dilute sulfuric acid, -hydrochloric acid, -oxalic acid, -acetic acid, sodium bisulfate, etc., whereby, as dilution agents, water as well as suitable organic solvents, such as alcohol etc. may be applied. The concentration of the hydrolytically acting agents to be used, varies with in wide limits mainly depending upon the temperatures applied; an aqueous sulfuric acid of about 0.5% strength at a temperature of about 80—90° C., being mentioned by way of example.

The invention is illustrated by the following examples, it will, of course, be understood that the invention can be varied within certain limits, subject to the materials under treatment.

Example 1.—100 grams of unstable cellulose acetate are heated for 3 hours at 100° C. with 10 times the quantity of 0.025% aqueous sulfuric acid. The acetate, after washing and drying, has thus been rendered stable.

Example 2.—100 grams of unstable cellulose acetate are heated for 1 hour at 85–90° C. with 10 times the quantity of 0.5% aqueous sulfuric acid. After washing and drying, the acetate has then been rendered stable.

Example 3.—100 grams of unstable cellulose acetate are boiled for ½–1 hour under a reflux condenser with 800 ccs. of 94% alcohol, to which 1% of 10% sulfuric acid has been added. The cellulose acetate, after being freed from alcohol in the customary manner, washed and dried, has then been rendered stable.

When the cellulose acetate is treated in the manner set forth in the foregoing examples any residue of the condensing agent, sulfuric acid, which may be combined or adsorbed is removed or split off, but there is no splitting off of the acetyl group from the cellulose acetate.

We claim:—

1. The process for improving unstable acyl celluloses which comprises treating an acyl cellulose with a hydrolytically acting agent of the group consisting of dilute acids of, at the most, 10 per cent strength and substances displaying an equivalent acid effect in contact with water, at atmospheric pressure and at temperatures up to 100° C., and interrupting the process before a splitting off of any of the organic acyl groups takes place.

2. The process for improving unstable acetyl cellulose which comprises treating an acetyl cellulose with a hydrolytically acting agent of the group consisting of dilute acids of, at the most, 10 per cent strength and substances displaying an equivalent acid effect in contact with water, at atmospheric pressure and at temperatures up to 100° C., and interrupting the process before a spliting off of any of the acetyl group takes place.

3. The process for improving unstable acyl celluloses which comprises treating an acyl cellulose with dilute, aqueous sulfuric acid of, at the most, 10 per cent strength at atmospheric pressure and at temperatures up to 100° C., and interrupting the process before a splitting off of any of the organic acyl group takes place.

4. The process for improving acetyl cellulose which comprises treating an acetyl cellulose with dilute, aqueous sulfuric acid of, at the most, 10 percent strength at atmospheric pressure and at temperatures up to 100° C., and interrupting the process before a splitting off of any of the acetyl group takes place.

5. The process for improving unstable acetyl cellulose which comprises treating an acetyl cellulose with aqueous sulfuric acid of about 0.5% strength at atmospheric pressure and at a temperature between about 80–90° C. for about one hour.

[L. S.]

ERICH CORRENS.
ALBERT MÖHRING.